Figure 1:
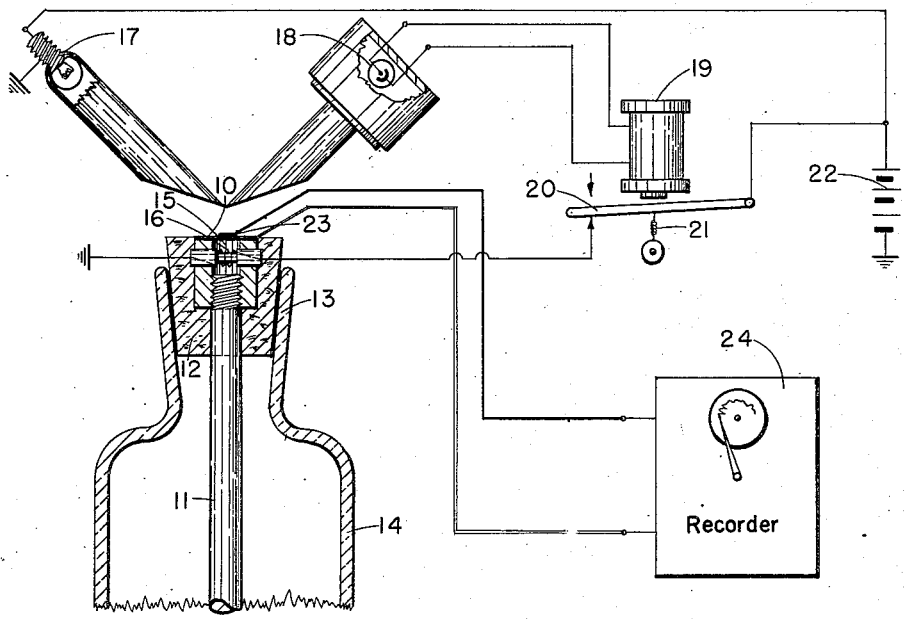

April 29, 1941.     C. W. THORNTHWAITE     2,240,082
DEW POINT RECORDER AND INDICATOR
Filed June 23, 1939     2 Sheets-Sheet 1

Inventor
Charles Warren Thornthwaite
By
Attorneys

April 29, 1941.                C. W. THORNTHWAITE                2,240,082
                          DEW POINT RECORDER AND INDICATOR
                              Filed June 23, 1939        2 Sheets-Sheet 2

Inventor
Charles Warren Thornthwaite
By
Attorneys

Patented Apr. 29, 1941

2,240,082

UNITED STATES PATENT OFFICE 2,240,082

DEW POINT RECORDER AND INDICATOR

Charles Warren Thornthwaite, Arlington, Va.; dedicated to the free use of the People in the territory of the United States Application June 23, 1939, Serial No. 280,832

4 Claims. (Cl. 73—51)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to an apparatus for determining the moisture concentration of a gas by the method of ascertaining its dew point temperature.

One of the objects of this invention is the provision of an apparatus which can be used to indicate the changes in the moisture concentration of a gas over periods of time.

This invention has many uses, such as in the field of weather forecasting. It can be used to determine evaporation from free water surfaces and evaporation and transpiration from land surfaces, which is of great importance in hydrology, agricultural climatology, and ecology. This invention also has commercial application in processes employing distilling or fractionating devices, such as in the manufacture of gasoline and alcohol. It is adaptable to the control of atmospheric humidity in air conditioning work and may be used to prevent loss of perishable goods, such as foodstuffs and tobacco, during transportation by ship or railway.

This invention is further useful in determining the moisture concentration of gases flowing through pipes, such as municipally supplied illuminating gas.

The following description, considered together with the accompanying drawings, will disclose this invention more fully, its constructions, arrangements, and operations of parts and further objects and advantages thereof will be apparent.

In the drawings:

Figure 1 is a schematic diagram of one embodiment of my invention.

Figure 2:
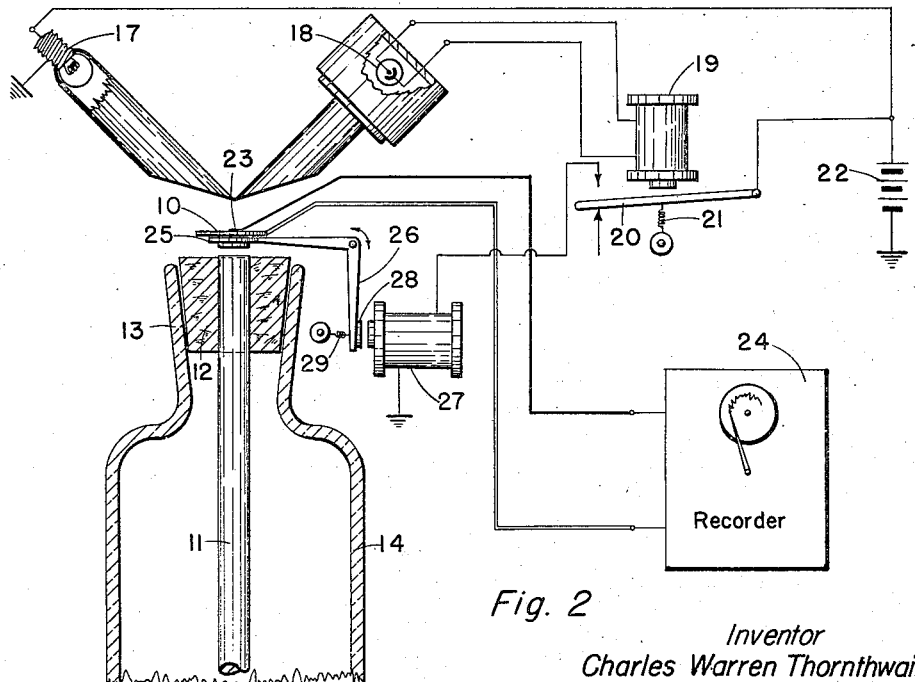
Figure 3:
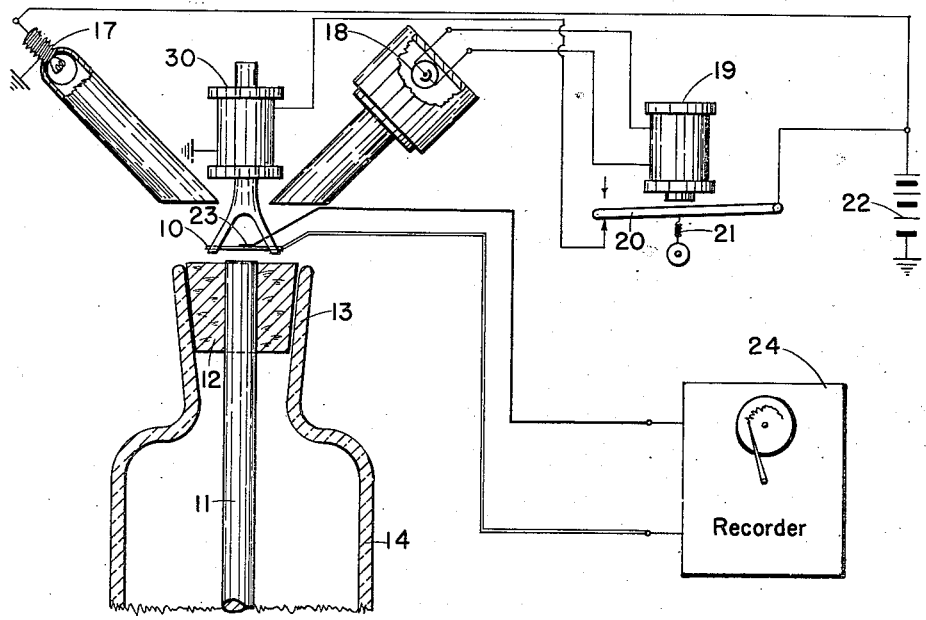
Figure 4:
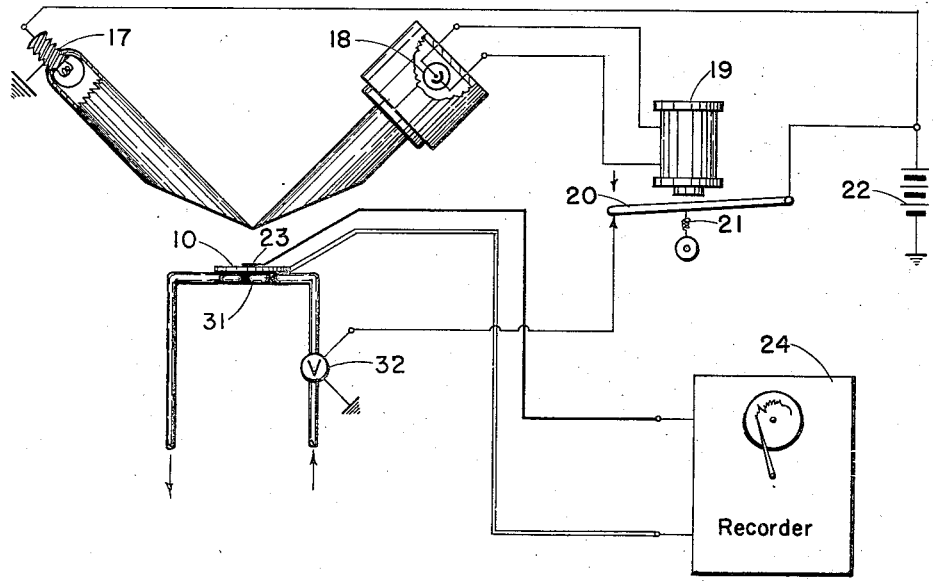

Figures 2, 3, and 4 illustrate, schematically, modifications of the embodiment shown in Figure 1.

Referring with more particularity to Figure 1, the numeral 10 designates a mirror or light reflecting surface, preferably of a heat conducting metal, in contact with the end of a heat conducting rod 11. The rod 11 is mounted through a heat insulating stopper 12, such as cork, which stopper is removably disposed in the mouth 13 of a container 14, preferably of a heat insulating material or construction, such as a conventional thermos bottle. The container 14 is adapted to hold a cooling medium, such as water-ice with salt, or dry ice with or without alcohol, or ether, or any other suitable cooling medium. The rod 11 extends within container 14 to contact the cooling medium placed therein. In this manner the rod 11 acts to transfer heat from its outer end to the locus of the source of cold within the container 14.

Near the outer end of the rod 11, an aperture 15 is provided in which is disposed an electrical heating element 16. A source of light 17 is provided, light from which is directed on the reflecting surface 10 at an angle. A photo-electric cell 18, or other suitable light sensitive means, is aligned to intercept the light reflected from said surface 10, substantially as shown. The photoelectric cell is electrically connected to a relay 19 having its switch 20 openable against the action of a spring 21 when energized. The switch 20 is in series with a battery 22 and the heating element 16. The battery 22 also may be used to supply energy for the source of light 17, which source is illustrated in the form of an incandescent lamp.

A thermocouple 23 is disposed on the member 10 and is electrically connected to a suitable temperature recording mechanism 24 of any type desired.

The operation of this embodiment is as follows: A source of cold is placed in the container 14 in contact with the heat conducting rod 11, by means of which heat is conducted from the member 10. Light from the source 17 reflects from the surface 10 to the photo-electric cell 18 which excites the photo-electric cell and causes it to energize the relay 19, whereby its switch 20 is opened, against the action of the spring 21, preventing the heating element 16 from being energized by the battery 22. Heat from the member 10 dissipates through the heat conducting rod 11 until moisture in the surrounding atmosphere condenses on the reflecting surface of the member 10. This condensation has the effect of lowering the reflecting efficiency of the member 10 so that the light reflected therefrom is insufficient to excite the photo-electric cell 18 sufficiently to energize the relay 19. Consequently the switch 20 is closed by the spring 21. The closing of this switch 20 causes the battery 22 to energize the heating element 16, which heating element being close to the member 10, heats it to a point where the dew or condensation formed on the surface of the reflecting member 10 is evaporated, thereby restoring its reflecting efficiency to a point where the photo-electric cell 18 is again excited, thereby again energizing the relay 19 and opening its switch 20. The heating element then stops functioning, permitting heat to drain into the source of cold and the entire cycle of operation is repeated. As the moisture concentration in the surrounding atmosphere changes, the temperature at which condensation will take place will vary and, accordingly, the temperature of the member 10 will vary. By means of the thermocouple 23 and the recorder mechanism 24, changes over a period of time of the moisture concentration in the atmosphere surrounding the plate 10 may be recorded.

The device shown in Figure 2 operates on a similar principle. However, in this case, instead of employing a heating element, the member 10 is fixed to the end 25 of a pivoted lever 26. The end 25 is adapted, to rest, in one position, on top of the heat conducting rod 11 and, in another position, to be disconnected therefrom so as to introduce atmospheric insulation between it and the rod 11. The lever 26 is actuated by an electro-magnet 27 acting upon a magnetically attractable element 28. When the electro-magnet 27 is not energized, a spring 29 urges the end 25 upward substantially as shown. The electro-magnet 27 is connected in series with the switch 20 of the relay 19 and the battery 22. In this embodiment the switch 20 is closed when the relay 19 is energized which permits the battery 22 to energize the electro-magnet 27 to act upon the lever 26 and draw the end of the lever 25 down upon the end of the heat conducting rod 11. In this position the member 10 is cooled until the point of condensation is reached thereby cutting off reflected light to the photo-electric cell 18, which, as in the previously described embodiment, opens the switch 20. The opening of this switch de-energizes the electro-magnet 27, which releases its attraction of the member 28, thereby permitting the spring 29 to elevate the end 25 of the lever 26 away from the heat conducting rod 11. The natural atmospheric insulation introduced therebetween permits the member 10 to rise in temperature to a point where the condensation of moisture thereon is evaporated, thereby restoring its reflecting efficiency and starting the cycle of operation all over.

The embodiment shown in Figure 3 is similar to the embodiment shown in Figure 2. In both of these embodiments the heating of the element is accomplished by elevating the member 10 out of contact with the end of the heat conducting rod 11. However, instead of using a lever to elevate the mirror 10, a solenoid 30 is bracketed to said mirror, which solenoid is energized in the same manner as the electro-magnet 27. The wiring diagram is substantially the same.

The embodiment shown in Figure 4 employs a different means of cooling. In this case the reflecting member 10 rests upon coils 31 connected to a suitable source of refrigerant through an electrically operated valve 32. This valve may be of any of the types known in the art and is actuated by the relay 19, substantially as shown. In this embodiment the temperature of the reflecting surface 10 is controlled entirely through the valve 32, being closed when condensation occurs on the surface of the member 10 and being opened when the moisture is evaporated. This latter embodiment may be modified in a variety of ways to the extent of employing a small electrically operated refrigerating unit (not shown) for the coils 31, which unit can be started and stopped by the relay 19.

Having thus described my invention, I claim:

1. A device for determining the changes in moisture conditions of a gas comprising, a source of cold, a heat-conductible rod having one end in contact with said source of cold, a plate having a light reflecting surface normally contacting the other end of the rod, a source of light, a light sensitive element, said reflecting surface reflecting light from said source to said light sensitive element while dry, an arm attached to said plate for moving the plate in and out of contact with said rod, means controlled by said light sensitive element for actuating said arm to move the plate in contact with the rod when the reflecting surface is dry and out of contact with said rod when the reflecting surface has moisture precipitated thereon, and means for measuring the temperature of said plate as an index of the moisture condition of the gas being tested.

2. A device for determining the changes in moisture conditions of a gas comprising, a source of cold, a heat-conductible rod having one end in contact with said source of cold, a plate having a light reflecting surface in contact with the other end of the rod, a source of light, a light sensitive element, said reflecting surface reflecting light from said light source to said light sensitive element while dry, an electrical heating element near said plate, a source of electricity, means controlled by said light sensitive element for connecting said heating element to said source of electricity when the reflecting surface has moisture precipitated thereon and disconnecting said heating element from said source of electricity when said reflecting surface is dry, and means for measuring the temperature of said plate as an index of the moisture condition of the gas being tested.

3. A device for determining the changes in moisture conditions of a gas comprising, a source of cold, a heat-conductible rod having one end in contact with said source of cold, a plate having a light reflecting surface normally contacting the other end of the rod, a source of light, a light sensitive element, said reflecting surface reflecting light from said source to said light sensitive element while dry, a lever having one arm attached to said plate for moving the plate in and out of contact with said rod, a spring for urging said plate out of contact with said rod, a magnetic attractable element attached to the other arm of said lever, an electro-magnet normally acting on said attractable element to hold said plate in contact with said rod against the action of said spring, means controlled by said light sensitive element for energizing said electro-magnet when the reflecting surface is dry and de-energizing said electro-magnet when the reflecting surface has moisture precipitated thereon, and means for measuring the temperature of said plate as an index of the moisture condition of the gas being tested.

4. A device for determining the changes in moisture conditions of a gas comprising, a source of cold, a heat-conductible rod having one end in contact with said source of cold, a plate having a light reflecting surface normally urged in contact with the other end of the rod, a source of light, a light sensitive element, said reflecting surface reflecting light from said source to said light sensitive element while dry, a solenoid, a movable core associated with said solenoid, said core being attached to said plate to move said plate out of contact with said rod when said solenoid is energized, means controlled by said light sensitive element for energizing said solenoid when moisture has precipitated on said plate and for de-energizing said solenoid when said reflecting surface is dry, and means for measuring the temperature of said plate as an index of the moisture condition of the gas being tested.

CHARLES WARREN THORNTHWAITE.